Dec. 4, 1956 T. H. HOLZER ET AL 2,772,848
FLUID SEAL ELEMENT
Filed Nov. 28, 1952
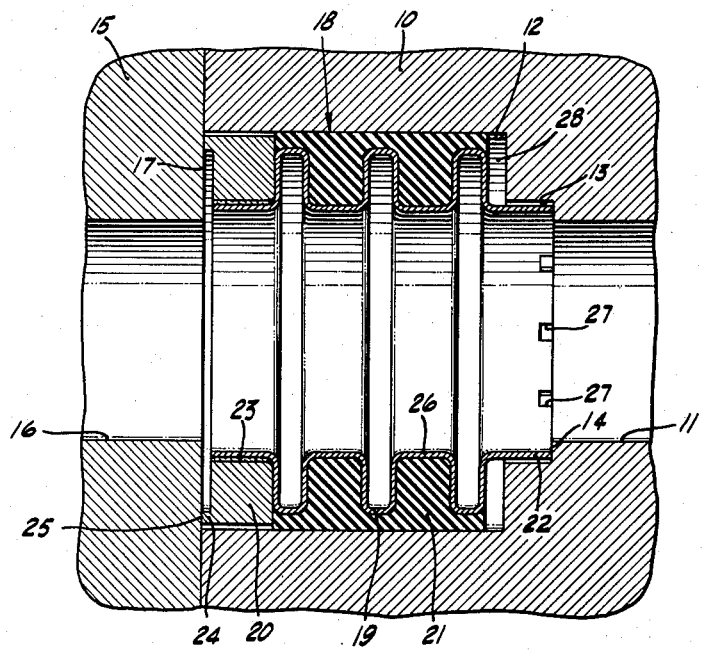
THEODORE H. HOLZER,
DONALD C. ASBURY,
INVENTORS
BY *Lyon & Lyon*
ATTORNEYS

United States Patent Office 2,772,848
Patented Dec. 4, 1956

2,772,848

FLUID SEAL ELEMENT

Theodore H. Holzer and Donald C. Asbury, Glendale, Calif., assignors, by mesne assignments, to The Parker Appliance Company, Cleveland, Ohio, a corporation of Ohio Application November 28, 1952, Serial No. 322,862

1 Claim. (Cl. 251—172)

This invention relates generally to fuel systems and more particularly to fluid seal elements operable under pressures ranging from 0 to 1000 p. s. i., such as used in modern aircraft fuel or engine oil systems.

The principal object of this invention is to provide an improved sealing device for sealing the joint between two ported relatively movable members.

Another object is to provide such a device incorporating a shear ring which may be positioned in a counterbore in one of the members and engage a sealing surface on the other of the members.

Another object is to provide a sealing device which constitutes a unitary assembly which may be installed and removed from the counterbore as a unit.

Another object is to provide a sealing device of this type which is constructed to permit the shear ring to tilt slightly in operation to accommodate itself to the sealing surface on the relatively movable member.

A more detailed object of this invention is to provide a sealing unit employing a metallic bellows having a shear ring at one end and having a rubber compound integrally bonded to the outer surface of the bellows and encompassing a major portion of the bellows for sealing within the counterbore.

Other and more specific objects and advantages will appear hereinafter.

The drawing shows a sectional elevation of a preferred embodiment of my invention.

Referring to the drawing, the body member 10 is provided with a fluid passage 11 communicating with a coaxial counterbore 12. An enlarged bore 13 may be provided to connect the passage 11 with the recess or counterbore 12. The annular shoulder 14 on the body connects the passage 11 and enlarged bore 13.

The member 15 is mounted for turning movement or sliding movement relatively to the body 10. This member 15 is provided with a port 16 and the member 15 may be moved to bring the port 16 into communicating relationship with the counterbore 12. The port 16 extends to the sealing surface 17 which is preferably ground and lapped.

In accordance with our invention, we provide a novel form of sealing unit generally designated 18 for sealing the joint between the passage 11 in the body 10 and the port 16 in the member 15. As shown in the drawing, this unit 18 comprises a metallic bellows 19 which carries a shear ring 20 at one end and which is encompassed by a body of synthetic rubber compound 21 which fits within the counterbore 12. The end 22 of the metallic bellows 19 engages the body shoulder 14.

The shear ring 20 may be fixed to the bellows 19 by means of welding or brazing 23. This shear ring is provided with a sealing lip 24 which has a ground and lapped surface 25 engaging the sealing surface 17 on the member 15. The surface 25 on the ring 20 is very narrow in width, as shown. The surface 25 is shaped to conform to the shape of the surface 17. Both may be cylindrical if the member 15 rotates or both may be optically flat if the member 15 slides relative to the body member 10. The outer diameter of the ring 20 is less than the diameter of the bore 12.

The bellows 19 is compressed axially between the body shoulder 14 and the sealing surface 17 in order to maintain initial sealing pressure between the surfaces 25 and 17. When fluid under pressure is admitted through passage 11, it passes through the central bore 26 of the bellows and into the port 16 on the member 15. Also fluid under pressure passes through apertures 27 provided in the bellows adjacent the end 22 and pressurizes the space 28 within the counterbore. The slight axial movement of the convolutions of the bellows 19 under the axial force exerted upon it from the space 28 causes the rubber sleeve 21 to seal tightly within the counterbore 12. The pressure of the fluid acting in the space 28 may be sufficient to compress the axial length of the sealing unit 18 so that the end 22 of the bellows 19 moves away from the body shoulder 14.

The metallic bellows 19 and rubber sleeve 21 permit the shear ring 20 to tilt slightly if necessary to accommodate itself to the position of the sealing surface 17 on the member 15. Slight inaccuracies in the parts therefore do not adversely affect the quality of the seal provided.

Having fully described my invention, it is to be understood that I do not wish to be limited to the details herein set forth but my invention is of the full scope of the appended claim.

We claim:

In a sealing device of the class described, the combination of: a first member having a fluid passage and a counterbore communicating therewith, said first member also having a shoulder, a second relatively movable member having a sealing surface and a port communicating with said surface, a sealing unit received in the counterbore, the sealing unit including metallic bellows having one end engaging the shoulder, a ring fixed to the other end of the bellows and provided with a relatively narrow sealing lip having a sealing face engaging the said sealing surface, the bellows having initial compression to maintain sealing pressure between said face and said surface, a rubber sleeve bonded to the outer surface of the bellows and encompassing a major portion of the length thereof, the outer surface of the rubber sleeve being of greater diameter than said ring and forming a seal with said counterbore, passage means establishing communication between the fluid passage and the counterbore at a location at the opposite end of the bellows from the ring, whereby fluid pressure in the passage acts to expand the rubber sleeve radially and also acts to increase the axial sealing pressure on the ring.

References Cited in the file of this patent

UNITED STATES PATENTS

| 1,889,868 | Montgomery | Dec. 6, 1932 |
| 1,905,583 | Giesler | Apr. 25, 1933 |
| 2,259,453 | Beyer et al. | Oct. 21, 1941 |
| 2,377,452 | Reynolds | June 5, 1945 |
| 2,464,136 | Jenkins | Mar. 8, 1949 |
| 2,548,128 | Snyder | Apr. 10, 1951 |
| 2,549,951 | Warren | Apr. 24, 1951 |
| 2,558,087 | Holl | June 26, 1951 |

FOREIGN PATENTS

| 459,851 | Italy | Oct. 6, 1950 |